US008327157B2

(12) United States Patent
West

(10) Patent No.: US 8,327,157 B2
(45) Date of Patent: Dec. 4, 2012

(54) SECURE ENCRYPTED EMAIL SERVER

(75) Inventor: Steven West, Fremont, NH (US)

(73) Assignee: Vistech LLC, Lee, NH (US)

( * ) Notice: Subject to any disclaimer, the term of this patent is extended or adjusted under 35 U.S.C. 154(b) by 363 days.

(21) Appl. No.: 12/705,720

(22) Filed: Feb. 15, 2010

(65) Prior Publication Data

US 2011/0202756 A1    Aug. 18, 2011

(51) Int. Cl.
*H04L 9/32*    (2006.01)
(52) U.S. Cl. ......................................... 713/189; 713/193
(58) Field of Classification Search .................. 713/181, 713/189, 193–194; 726/2–3, 26–30
See application file for complete search history.

(56) References Cited

U.S. PATENT DOCUMENTS

| 6,198,824 | B1 | 3/2001 | Shambroom |
| 6,732,101 | B1 | 5/2004 | Cook |
| 7,096,254 | B2 * | 8/2006 | Awada et al. ................. 709/206 |
| 7,136,841 | B2 | 11/2006 | Cook |
| 7,188,358 | B1 * | 3/2007 | Hisada et al. ..................... 726/2 |
| 7,475,256 | B2 | 1/2009 | Cook |
| 7,493,661 | B2 | 2/2009 | Liu et al. |

* cited by examiner

*Primary Examiner* — Hosuk Song
(74) *Attorney, Agent, or Firm* — Z IP Law PLLC; Claire Zopf

(57) ABSTRACT

A computing system utilizing a local or remote secure email server that intercepts secure message that include an identifying domain extension provides secure data transmissions between internet or intranet users. The secure email messages can only be accessed from the secure email server by an intended recipient.

14 Claims, 7 Drawing Sheets

SECURE ENCRYPTED EMAIL SERVER

FIELD OF THE INVENTION

The invention relates generally to computing systems utilizing a secure email server that can only be accessed by an intended recipient and more particularly to a local or remote email server that intercepts secure messages including an identifying domain extension to provide secure data transmissions between internet users.

BACKGROUND OF THE INVENTION

The present invention relates to improving the security of data transmission between computers across a global network of computers, i.e. the Internet. In particular the present invention is directed to a method and system for improving the security of messages transmitted from a client to a network server and then to a destination server on the same (intranetworks) or different (internetworks) network systems.

Computer networks, particularly internetworks, can be vulnerable to security breaches. The degree of security of each component in the network differs, in part because each entity may be protected by varying layers of physical and operational security. Furthermore, each component or network in an internetwork may be owned or controlled by different organizations whose security practices differ widely. The interconnections between the computers may be similarly insecure. Part of the network may use physically insecure links, such as telephone lines or microwave links, hackers and interlopers may eavesdrop or intercept communications over the telephone line and modify them according to their wishes or copy them for later use. Interlopers who copy login and/or command information have the potential to use that information to gain access to other computers on the network.

An internal computer network, an intranet, or an external global computer network, the internet, use standard communication protocols such as Transfer Control Protocol/Internet Protocol (TCP/IP) to transfer messages and data from one computer system to another. However, many email transmissions and file transfers are not directly supported by TCP/IP but instead are implemented through application specific protocols that relay on TCP/IP for basic data transport services. Most email transmissions are in fact sent as unencrypted data in clear text format that may be intercepted and read by those other than the intended recipient.

Prior art systems have been developed to address network security issues. For example, two authentication protocols, Secure Sockets Layer (SSL) and Hyper Text Transfer Protocol Secure (HTTPS), have been designed specifically to protect the information being transmitted across the Internet by using encryption. Both the client and the destination server must support SSL. SSL is an independent application that operates at the Transport layer, meaning that it operates with application protocols such as HTTP, ftp, telnet, gopher, Network New Transport Protocol (NNTP), and Simple Mail Transport Protocol (SMTP). SSL supports several cryptographic algorithms to handle the authentication and encryption routines between the client and the server.

Encryption mechanisms have been developed to ensure the integrity of information sent over the Internet. Two common encryption techniques are symmetric key encryption and public key encryption. In a symmetric key encryption, a unique key is identified and used by the sender to encrypt and by the receiver to decrypt a message. In public key encryption, separate keys are used to encrypt and decrypt.

Both symmetric key and public key encryption require a key exchange. That is, where symmetric key encryption is used, the sender must provide the recipient with the key so that the recipient can decrypt an associated message. In public key encryption, the key exchange includes the publication of a recipient's public key that in turn is used by the sender to encrypt a message. A corresponding private key is used by the recipient to subsequently decrypt the encrypted message. Publication can be by posting the public key, for example, to a central site, or by providing the public key directly to the sender.

In these scenarios, the recipient's computer must include a decryption engine (software that used an appropriate key to decrypt the message). Because there are a variety of encryption algorithms being used on the Internet, a recipient needs to have many different types of decryption engines installed to be able to receive secure messages universally. If the intended recipient does not have a particular decryption engine, the sender cannot utilize that particular encryption technique to send the secure message. For those recipient's who do not have any decryption engine installed, the message simply cannot be sent securely.

A common solution to this problem is to install software based applications onto local email servers that encrypt email text and then require a recipient to provide a key or identifier to decrypt the message. This requires the sender to communicate the key or identification protocol that must be used by a recipient in order to decrypt and receive the message. Some software based applications may use internal identifiers and time certificates to verify the identification of the sender and recipient and automatically allow an encrypted message to be received between the identified sender and recipient, based upon software and encryption/decryption protocols installed by the sender and recipient. However, if the encryption/decryption software protocols are not installed or are incompatible between the sender and recipient then the message cannot be received or conversion and extraction software protocols must be used to modify the sender or recipients email transmission protocols in order to allow an encrypted message to be read.

The application of a forwarding server that modifies and re-encrypts an encrypted email message to match the delivery preferences of a recipient is described by Cook in U.S. Pat. No. 6,732,101. This application however requires that the sender and recipient to create public and private keys that are used by the software application to allow a wrapping application to secure the email transmission by adding an additional layer to the message that allows decryption of the message only if the proper public and/or private key is provided.

Cook further describes a web browser application that would allow access to minimally secured messages from a sender to a recipient that does not have the proper encryption protocols installed. The web browser communication would use a Secure Socket Layer (SSL) protocol to allow access to the minimally secure email messages. However to view highly secure encrypted messages the recipient must be fully configured with decryption tools and programs to access the secure transmission.

A need exists for a secure email transmission protocol that does not require specialized and compatible encryption software but would allow encrypted messages to be received by email servers that do not have decryption tools in order to accept and access encrypted messages. The solution is to provide a secure email server that allows only the intended recipient of a message to log onto and view the encrypted message and wherein the secure email server does not require the recipient to install additional software to access the encrypted message on the secure server.

OBJECTS AND SUMMARY OF THE INVENTION

The present invention does not require the user to install any software. The below described system utilizes a secure encrypted email server that may be installed remotely from a user's email exchange server through an internet connection using a secure transmission protocol or within a user's local area network (LAN). The secure email server includes one or more computer systems with hard drives, memory and operational software to configure the server to receive and send encrypted email messages. The email server stores and provides access to encrypted emails only to users accepted by the administrative software of the encrypted server. The administrative software further allows the server to accept only secure encrypted emails on the server or accept all emails both encrypted and unencrypted.

The secure email server is configured by setting a server domain address within the server administrative software to a name using HTTPS that resolves to a configured communication port of the secure server, such as; https://secure.mycompany.com. The local domain for a company's email exchange server is also configured within the administrative software to the domain that is normally used to receive email, for example; mycompany.com. Using this configuration, the secure encrypted email server intercepts only secure email message from other non-encrypted email messages by determining a pre-configured email extension that matches the accepted email extension of the domain name of the secure server. The extension, such as mycompany.com.secure directs an encrypted email to the secure email server from the sender's email exchange server.

In receiving an email message, the secure encrypted server first determines if the communications link between the sender and recipient is encrypted using a secure transmission protocol such as Transport Layer Security (TLS). If the communications link is secure, the proper email address extension is verified to determine if the address matches the address of the user's domain, for example; mycompany.com. The proper email address extension key is then verified to determine that the email message is encrypted and should be routed to the secure encrypted email server for access only by valid recipients. The address extension key may be selected by the user and be in the form of a word or phrase placed at the end of a recipients email address, for example; swest@mycompany.com.secure to properly identify an encrypted message from a non-encrypted message. A non-encrypted message, one that does not include a valid extension key in the email address, may be directly routed to the user's unsecure email exchange server.

If the email address does contain a valid address extension key, the email address is then further verified for a proper recipient address from a list of valid recipients on the secure encrypted email server. If the recipient is identified by the secure server then the email message is accepted and an unencrypted notification email, i.e. an unsecure invitation, is sent to the recipient notifying them that a secure message has been received by the secure email server. The secure email message is stored on the secure email server for later retrieval by the recipient. If the preceding steps fail then the email message is rejected by the secure email server and a notification email is sent to the sender notifying them that the recipient did not receive the email message. The secure email server removes the email address extension key from a notification email message. A log file that includes information about each message that is sent and received, the time of the message, and the status of the message as read or not read and the time of receipt is created on the secure email server.

The recipient receives notification via the invitation email that a secure email message has been received by the secure email server. The invitation email includes a non-secure Hyper Text Markup Language (HTML) attachment that includes a link to direct the recipient to the secure email server using HTTPS. This secure protocol will include a password for a first time recipient to allow the recipient to login to the secure email server. A second password specific to the encrypted message may also be provided.

Once the recipient clicks on the link in the HTML attachment they are directed to the secure email server using HTTPS. The HTML link may include specific encoded information that ties the recipient address to the HTML link thereby preventing forwarding of the HTML link to another recipient and preventing an unintended recipient from gaining access to the secure server using the password. The secure server displays a login prompt to the recipient. The recipient logs into the secure server using their email name and the password provided. The login prompts for the recipient's password (provided in the email invitation) and asks a question that only the recipient has the answer to. This question is saved for later use if the recipient forgets their password.

Once the user has logged in they can select read email to view the secure encrypted message sent to them by the sender. The user can also select to reply to the received message and send a secure encrypted reply email message to the sender. The secure encrypted reply email message is sent to the sender's email server using secure encrypted TLS. If the link between the secure encrypted server and the sender's server is not secure that is not using a secure protocol such as TLS then a non secure invitation email message is sent to notify the sender of the secure reply message as described above.

The first time a secure encrypted email message is read an un-encrypted email message is sent to the sender notifying them that the secure encrypted email message was read. This way the sender has no doubt about the delivery of the secure message. To further ensure delivery of the invitation to the proper recipient, the email invitation message that is sent to the recipient is unique in that it contains the senders email name along with the sender real name. For example: the email invitation would contain usersmith@usercompany.com "User Smith" in the from field and message body, in this way a verification by the secure server of the sender may be performed.

Using the described method of adding an extension to the recipients email address in the senders email client will lend itself to being added to the senders address book. Adding the recipient's email name with the extension to the address book, will prevent the sender from sending a secure encrypted email without adding the extension by mistake. The senders can then just click or type the recipient's name and the email client will have the secure extension for the recipient or the sender will be able to select it.

Alternatively all email can be routed through the secure server by configuring only an HTTPS domain name. If this configuration is selected then an extension in the address line may be used to denote an email message as secure or an identifier tag may be added to the subject line of the email, such as $s$ to denote an email message as encrypted and direct the server to complete the steps of verifying a secure transmission protocol such as TLS to send or receive an email, a proper email extension or identifier tag in the subject line, and a proper recipient address. Once a message is identified as encrypted it may be stored on the secure server and an invitation email may be sent to the recipient and notification to the sender as described above.

Configuration of the secure server may be completed through a keyboard and display attached to the server to access the administrative software or through a web browser. The secure server may be further configured to update network parameters that will allow all email messages to be sent to the secure server as an intermediate mail server in order to allow validation of extension keys and verify secure transmission protocols prior to sending an email message to the internet. The secure server may also be configured with a relay control that would allow only authorized users of the secure server to send email messages over the user's network. A login prompt may also be configured to require a user to login to the secure server in order to allow transmission of an email message to the internet or alternatively only computers within the user's LAN subnet could transmit email messages. The secure server may also be configured to use an SSL protocol for transmission.

User accounts each having unique email addresses are also configured within the administrative software of the secure server. These accounts may be created automatically when secure encrypted email is received. For users configured on the secure server user account settings such as which users are authorized to send encrypted emails may be configured and unauthorized users such as a former employee may be deleted from access to the server. A user that has logged into the server has direct access to new email messages as they are populated on the secure server. A logged in user may have access to normal email server operations such as; changing a password, forwarding mail, controlling spam, use out of office reply, read email, send email, and setup and view meeting events. The secure server may also be configured to allow user login through a web browser. Administrative tools on the secure server may override any user inputs, may perform status checks, configure and review log files and configure global secure server settings through the administrative software.

An authorized users list configured on the secure server prevents the sending or forwarding of any email from the secure server from a non-authorized sender and/or to a non-authorized recipient. As discussed above a new user that receives notification of a secure email must be verified against the authorized users list and provide the proper HTML link and password before access to the secure server is granted. The administrative tools also allow discreet access to email to allow emails to only be viewed by the proper recipient and the deletion of a user from the authorized list if secure server access should be denied. An administrator to the server may be configured to have global access to all emails and archive or delete emails periodically from the server as required. The secure server may also accept attachments to email messages.

An object of the present invention is to provide an encrypted email server that may be installed remotely from a user's LAN email exchange server.

Another object of the present invention is to provide an encrypted email server that may be installed within a user's LAN email exchange server.

Another object of the present invention is to allow secure email messages to be intercepted by the encrypted email server.

Another object of the present invention is to securely send encrypted messages using secure transmission protocols such as Transport Layer Security (TLS) or encryption to a receiving encrypted server.

Another object of the present invention is to provide for verification of a sender and recipient against an authorized users list on the encrypted server and prevent the sending or forwarding of an email message from a non-authorized sender and/or to a non-authorized recipient.

Another object of the present invention is to notify a non-authorized recipient of an encrypted email message and automatically validate the identification of the recipient in order to allow access by the recipient to the secure encrypted server.

The present invention is directed to an electronic mail server system for handling encrypted email messages comprising a first server including a microprocessor and a controller for receiving and disseminating email messages composed by a sender, a secure server including a microprocessor, a controller and a database for storage of email messages communicating with the first server, a first computer workstation where the sender composes email messages connected to and in communication with the first server, a second computer workstation where a recipient receives an email message from the secure server, and wherein an encrypted email message is composed by the sender at the first computer workstation and the secure server stores the encrypted email message and sends an unencrypted invitation to the second computer workstation, the invitation including a link defining an access path for the recipient to view the encrypted email message stored on the secure server.

The present invention is also directed to a method of sending and viewing encrypted email messages comprising the steps of, providing a first server including a microprocessor and a controller for receiving and disseminating email messages composed by a sender, providing a secure server including a microprocessor, a controller and a database for storage of email messages communicating with the first server, connecting a first computer workstation where the sender composes email messages with the first server, providing a second computer workstation where a recipient receives an email message from the secure server, and composing an encrypted email message by the sender at the first computer workstation and storing the encrypted email message at the secure server and sending an unencrypted invitation from the secure server to the second computer workstation including a link defining an access path for the recipient to view the encrypted email message stored on the secure server.

These and other features, advantages and improvements according to this invention will be better understood by reference to the following detailed description and accompanying drawings.

DETAILED DESCRIPTION OF THE INVENTION

Figure 1:
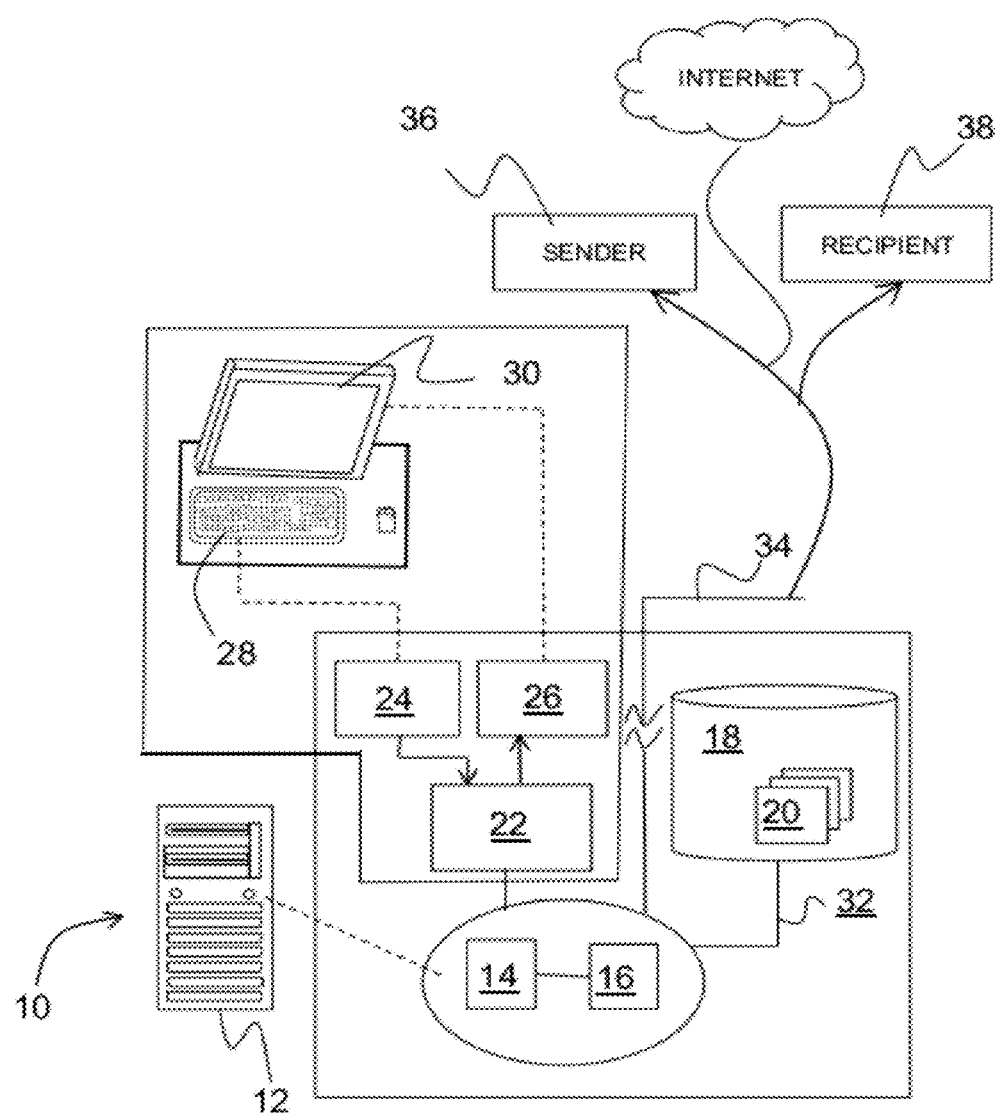
FIG. 1 is an exploded view of the secure server system of the present invention.

The present invention can be implemented in computer hardware and computerized equipment. FIG. 1 illustrates an embodiment of the system. The secure encrypted email server system 10 has a system server 12, with a computer processor 14 and control software 16. The system server 12 also has a database 18 having a collection of email message records 20. The system server 12 includes a controller 22, and input units 24 and output units 26 connected to the controller 22. The system 10 optionally has a user interface 22 that includes user controls 28 and a display 30 and can include some or all of the input and output units 24, 26. Components are connected by signal paths 32 and, in this embodiment, the system components and signal paths are located within the system server 12 as illustrated. In other embodiments, one or more components and signal paths can be located in whole or in part outside of the system server 12 such as through an internet connection 34 that allows access to server system from a remote site. The secure encrypted server as shown in FIG. 1 includes the controller 22 that operates the other components of the system utilizing stored software 16 and data 20 based upon signals from the input units 24. The controller 22 can include, but is not limited to, a programmable digital computer, a programmable microprocessor, a programmable logic processor, a series of electronic circuits, a series of electronic circuits reduced to the form of an integrated circuit, or a series of discrete components.

In addition to functions necessary to operate the system, the controller 22 manipulates email message records 20 according to software programs 16 stored in memory 21 either automatically or with user intervention. "Memory" refers to one or more suitably sized logical units of physical memory provided in semiconductor memory or magnetic memory, or the like. Memory of the system can store a computer program product having a program stored in a computer readable storage medium. Memory can include conventional memory devices including solid state, magnetic, optical or other data storage devices and can be fixed within the system or can be removable. For example, memory can be an internal memory, such as, such as SDRAM or Flash EPROM memory, or alternately a removable memory, or a combination of both. Removable memory can be of any type, such as a Secure Digital (SD) type card inserted into a socket and connected to the controller 22 via a memory interface. Other types of storage that are utilized include without limitation PC-Cards and embedded and/or removable hard drives.

In the embodiment of FIG. 1, the system server 12 is shown having a hard drive, a disk drive for a removable data storage disk such as an optical, magnetic or other disk memory (not shown) and a memory card slot that holds a removable memory, such as a removable memory card and has a removable memory interface for communicating with removable memory. Data including but not limited to control programs, digital images and other image records, and metadata can also be stored in a remote memory system such as a personal computer, computer network or other digital system.

The input units 24 can comprise any form of transducer or other device capable of receiving an input from a user and converting this input into a form that can be used by the controller 22. Similarly, the output units 26 can comprise any form of device capable of delivering an output in human perceptible form or in computer readable form as a signal or as part of a computer program product. Input and output units can be local or remote. A wired or wireless communications system that incorporates hardware and software of one or more input and output units can be included in the system.

The software 16 installed on the system server 12 or installed remotely to access the system server provides for configuration of the system server 12 to a local area network (LAN) using a static or dynamic IP address. The server software 16 also provides for configuration of the secure email server on the user's LAN using Hypertext Transfer Protocol Secure (HTTPS). This protocol a combination of the Hypertext Transfer Protocol (HTTP) with the SSL/TLS protocol provides encryption and secure identification of the server. An HTTPS URL may be configured to a domain name of the server IP address that resolves to port 443 of the secure email server allowing an external client the ability to obtain a TLS connection on the secure email server. The software 16 also allows the generation of a public encryption key, a private key and certificate signing request to purchase a trusted certificate authority in order to establish a secure TLS connection.

The software 16 installed on the system server also allows a configuration of a unique email extension in the address line that identifies an email message as secure. Alternatively, the server may be configured to add an identifier tag to the subject line of the email to denote a secure message, such as $s$ to denote an email message as encrypted. An incoming secure email uniquely identified may be directed to a secure server to be verified as a secure transmission. Importantly, the solutions described below do not require the user to install any encryption specific software on their network.

The Small Business Mail Encryption (SBME) which utilizes the secure encrypted email server system 10 above may be installed using at least two different configurations. The first example shown in FIG. 2A passes all email from the unsecure email server 42 through the secure encrypted email server system 10. The second configuration seen in FIG. 2B passes only the secure email through the secure encrypted email server system 10, all other unsecured email passes directly from the unsecure email server 42 to the internet, and to the intended recipient.

Figure 2A:
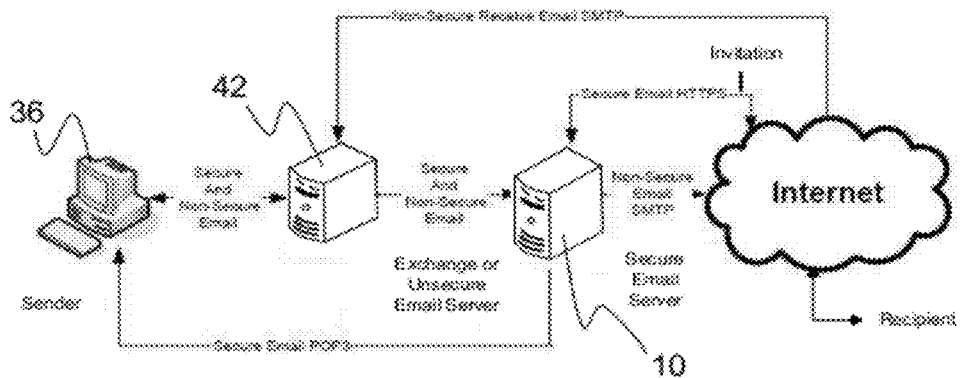
FIGS. 2A and 2B are perspective view of two embodiments of the present invention.
Figure 2B:
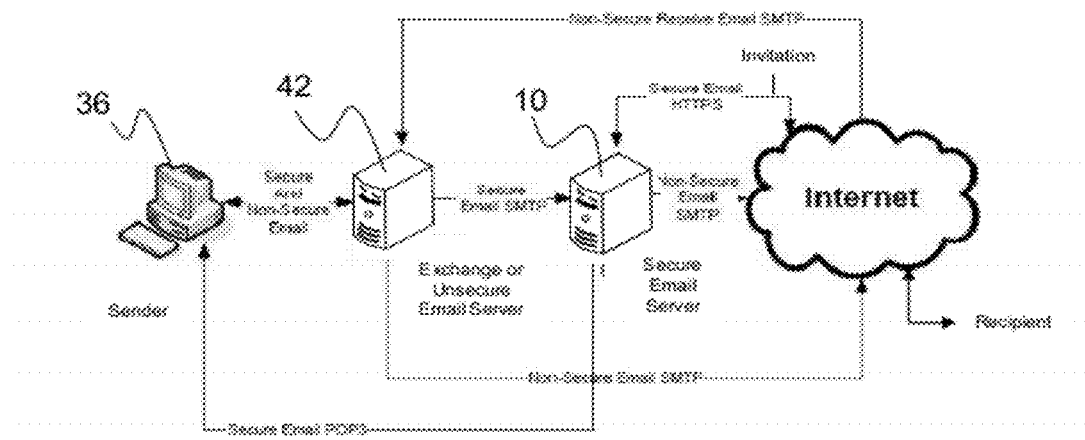
Figure 3:
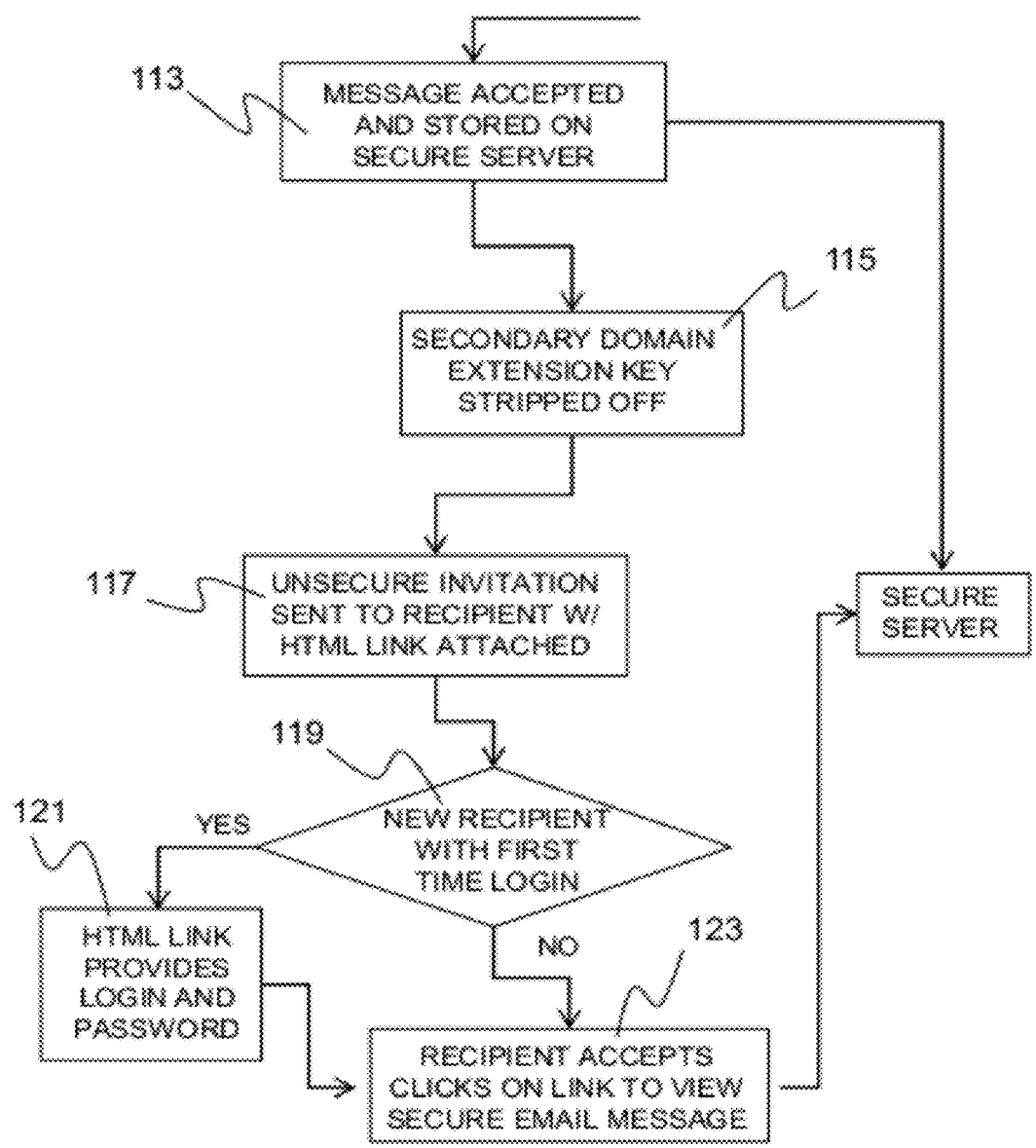
FIG. 3 is a flowchart of the process of sending a secure email of the present invention.

In either configuration, in an initial embodiment of the present invention as shown in FIGS. 2A and 2B, in order to overcome the above noted software and hardware problems that not all email servers can receive encrypted email messages, the secure encrypted server system 10 described above is provided so that a secure message from a sender 36 is directed to, identified and saved by the secure encrypted server system 10. Subsequently, only an intended recipient 38 can log into and view the message in the secure encrypted server system 10 where the message is designated as secure by the sender 36. To accomplish this, in a first step 101 as shown by the flow diagram of FIG. 3 the recipient's destination email address is modified so that the encrypted email server recognizes and can intercept any message designated by the sender as "secure".

A sender can compose and send a message as either "secure" or "unsecure". An unsecure message would occur just as it currently does for example through conventional email clients such as Microsoft Outlook or Outlook Express. A message from the sender would include the sender and the recipient's normal top level or country code domain e.g. .com, .bis, .net, .us etc., as well as the recipient's subdomain. By way of example a message to, swest@mycompany.com, would go essentially directly from the sender's normal email server 42 to the recipient's email server 38 as shown in FIG. 2B as an unencrypted message.

To send a secure message, in the present embodiment the recipient's destination email address would be changed to include a unique key which permits the secure encrypted server system 10 to identify the user or users that are sending the secure email. A domain extension key would be added by the sender at step 101 following the initial top level domain, for example the domain extension key could be modified to swest@mycompany.com.1000.secure.com. The domain extension key is thus "1000.secure.com" for instance, and uses a secondary domain name "secure.com" as a secure message identifier and the number "1000" as a unique sender key for the receiving encrypted server to identify and validate the user or users that are sending the secure encrypted email.

Figure 5:
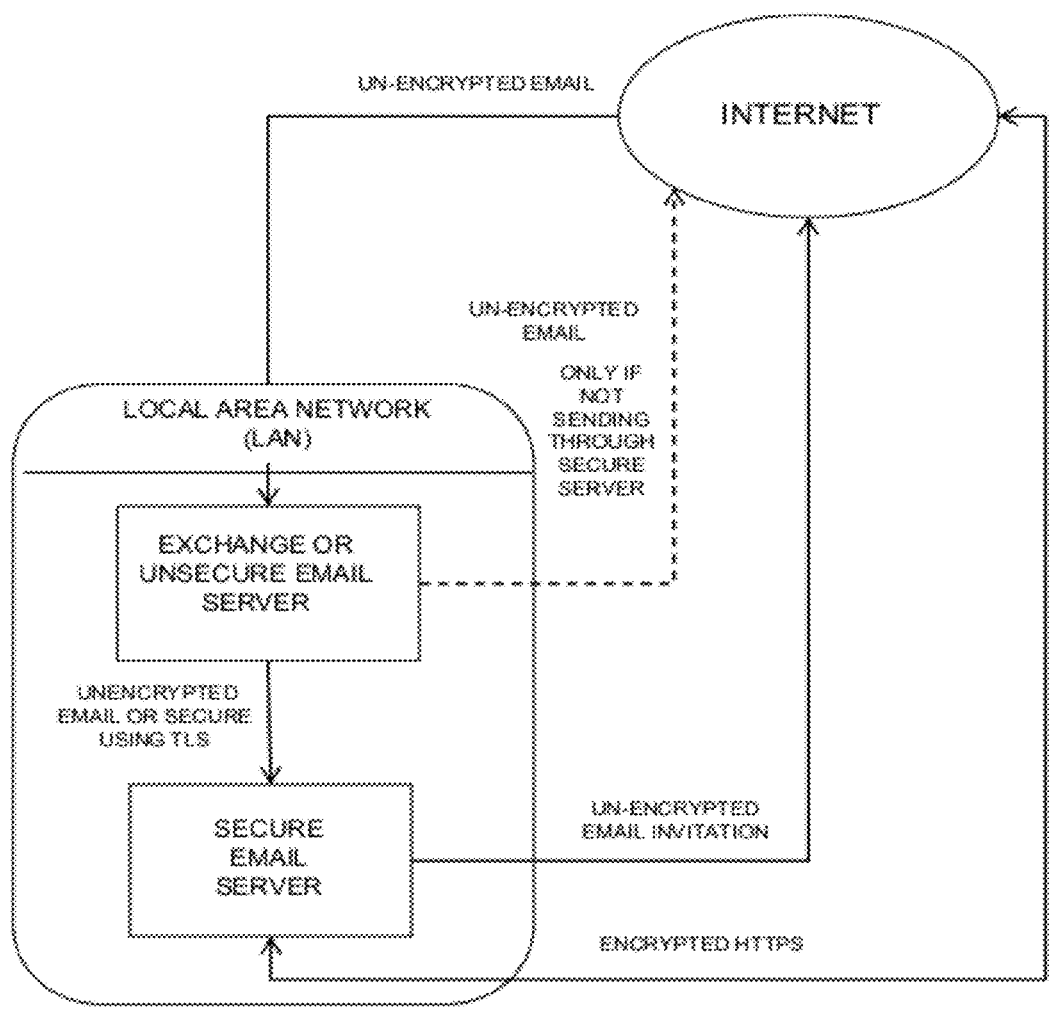
FIG. 5 is a representation of the secure email server of the present invention at a remote location using an internet connection.

In either case described above, the message is composed by the sender 36 the domain extension key added at step 101 and the sending server 42 in the sender's LAN sends at step 103 the secure email to the secure encrypted server system 10 as shown in FIGS. 2A, 2B. It is important to note that the secure encrypted server system 10 could be located on the sender's LAN as in FIG. 3 or at a remote location 40 using TLS across the internet between servers for security as shown in FIG. 5. A further description of the differences between secure server locations is provided below.

This first embodiment is directed to the aspects shown in FIG. 5 where the secure server 10 is located remote from the user, i.e. sender. If there is no domain extension key attached to the message the secure encrypted server system 10 can either reject the message and notify the sender, or pass the message through to the recipient as indicated by the conventional domain.

The secure server 10 checks that the secondary domain extension key is initially present at step 105 and if the communications link between the sending email server and the secure encrypted server system 10 is encrypted using TLS or other such secure intranet or internet protocol and is secure, then the message is preliminarily accepted by the secure encrypted server system 10 at step 107. Where the recipients email address has attached to it the appropriate secondary domain name "secure.com" to identify the secure email server at step 109, the secure server 10 proceeds at step 111 to check the unique sender key identifier to ensure that the sender is validated according to a known association of senders for example on a look up list, with the particular sender key identifier. If any of these steps fail, then the message is rejected and an un-encrypted message is sent back notifying the sender that the recipient did not receive the secure encrypted email message.

If all the above steps are accomplished and the unique key identifier validated against the look up list, the secure encrypted server system 10 accepts and stores the message for later retrieval by the recipient of the email message at step 113 and strips the domain extension key off the email name at step 115 for sending later to the correct email address, e.g. swest@mycompany.com of the recipient. Accounting information about the user, i.e. sender, is also stored with the email message on the secure server, the accounting information being derived from the unique key identifier e.g. 1000.

When an encrypted email is accepted at step 113 by the encryption server a non-encrypted email message invitation is composed and sent to the recipient at step 117. This non-secure email invitation tells the recipient that there is a secure encrypted email for the recipient to view. The email invitation contains an attachment in HTML (Hyper Text Mark-up Language) with a link that directs them to the secure encrypted email server using HTTPS. The attachment of the link is important because if the HTML address is merely in the body of the email, many spam filters would reject it. If this is the first time the recipient has received a non-secure email invitation at step 119 then the recipient's password for the secure encrypted server login is included at step 121.

Once the recipient clicks on the link in the HTML attachment at step 123 the recipient is directed to the secure server using HTTPS. The secure server displays a login prompt to the recipient. The recipient logs into the server using their email name and the password provided. The login prompts for the recipient's password (provided in the invitation) and asks a question that only the recipient knows the answer to. This question, and answer is saved for later use if the recipient forgets their password.

Once the recipient has logged in they can select a button or command e.g. read email, to view the secure encrypted message sent to them by the sender 36 and stored on the secure encrypted server system 10. The recipient 38 can also select to reply to the received message and send a secure encrypted reply email message to the sender 36. The secure encrypted reply email message is sent to the original sender using secure encrypted TLS to the senders email server 42. If the link between the secure encrypted server system 10 and the original sender's server is not secure and using TLS than a non-secure invitation email message is sent to the sender as described above requiring the sender 36 to login to the secure server system 10 to receive the email.

The first time a secure encrypted email message is read an un-encrypted email message is sent back to the sender 36 notifying them that the secure encrypted email message was read. This way the sender 36 is assured that the secure message was delivered to the recipient.

Also, the secure encrypted email invitation that is sent to the recipient is unique in that it contains the senders email name along with the sender's real name. For example the email invitation would contain, swest@mycompany.com "Steve West" in the from field and message body. In this way, with the stripping off of the added domain extension key as an extension to the real domain of the recipient as discussed above, the invitation includes the appropriate senders email and sender real name in the "from" field and message body. Adding the recipient's email name with the extension to the address book, will prevent the sender from sending a secure encrypted email without adding the extension by mistake. The sender and recipient can then just click or type the recipients name and the email client will have the secure extension for the recipient or the sender available to select it.

Figure 4:
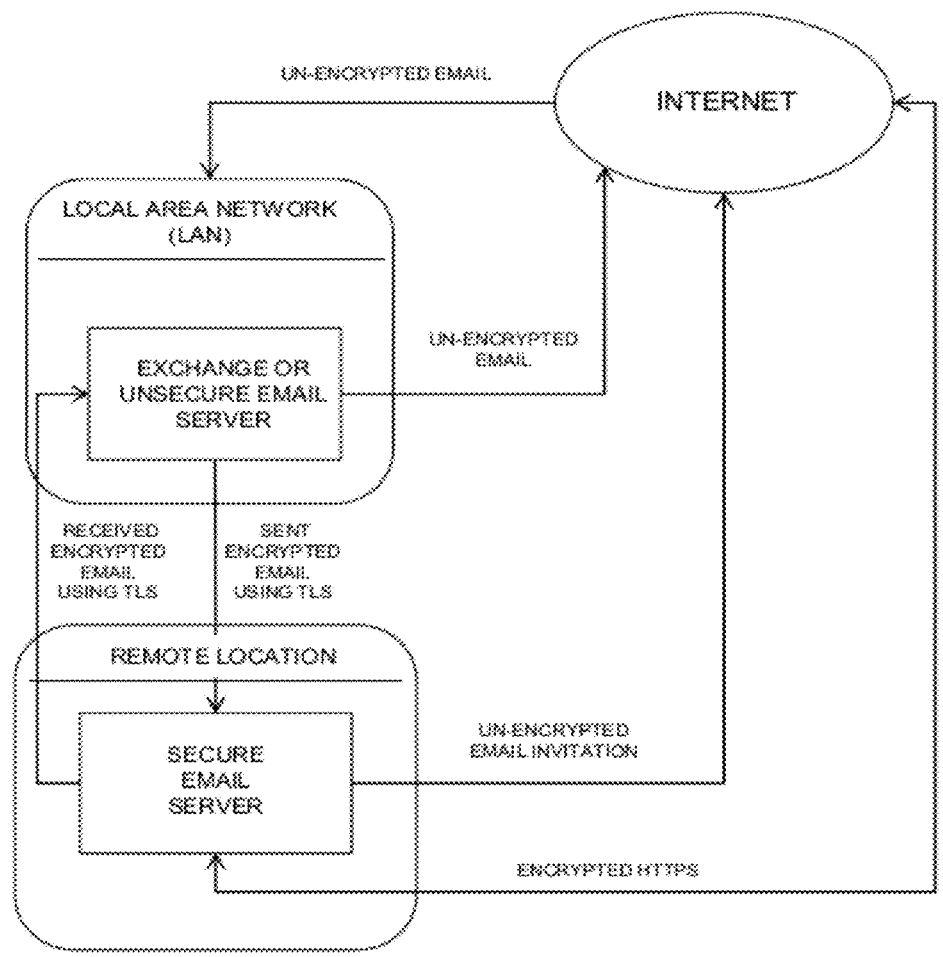
FIG. 4 is a representation of the secure email server of the present invention on a user's local area network.

The embodiment of the invention described below is an arrangement where the secure encrypted server system 10 is located with the sender 36, e.g. as part of the sender's LAN. In this embodiment as best seen in FIG. 4, the domain extension key as discussed above enables the sender's initial unsecure email server to pass the secure email through to the secure email server 10 by recognizing the domain extension key and routing the secure email appropriately. Any unsecured email is not routed to the secure email server and will flow through only the unsecure email server and out to the Internet to the recipient without passing through, or being saved by the secure email serve 10.

Using the same method of adding the domain extension key to the recipient's email address as described in the first embodiment, the email client will send email to the client's email server. The client's email server will use DNS and do an MX record lookup and find that the domain to send to is that of the secure email server 10 on the client's LAN.

The user will generally add a special domain name to their MX record at the domain registry with a * in front of the clients domain name and use the local IP address of the secure encrypted email server as the destination. The MX record that the client could register would be *.secure.mycompany.com an IP address could be 192.168.1.151 (local to the client's LAN or intranet).

If the sender's domain extension key is, mycompany.com, a normal email recipient's address would be for example jeff@bigcorp.com. To get the email to be appropriately routed to the secure email server, the sender would attach the domain extension key to get, jeff@bigcorp.com.securemycompany.com, in the recipient field of the senders' email. The secure encrypted email server would receive the secure encrypted email message from the client's email server and save and encrypt the message as described in invention 1. Again the secure encrypted email server strips off the domain extension key from the recipients email name as previously described.

In a still further embodiment of the invention the email server can send all email to the secure encrypted email server. In this case a special subject field key can be put into the subject field of the senders email, for example $s$, or any similar identifier to denote to the secure server that this is a secure encrypted email. The secure server would save, encrypt and send an invitation as described above to a recipient or recipients. Placing a subject field key into the subject field would thus enable the sender to send securely to a multiple recipients without having to put a domain extension key on each recipient's address.

In this embodiment other methods of denoting an email as secure could include a simple extension to a recipient's domain such as jeff@bigcorp.com.secure, this simple extension does not need to be a valid domain name for Internet routing, just a phrase that the clients email server will pass along to the secure encryption server denoting the email as secure. Another method includes adding an extension to the sender's email. For example, FROM: swest@mycompany.com.secure. The advantage of using the notification in the senders email name is that the sender can send securely to multiple recipients, similar to the $s$ in the subject line. In these embodiments the HTTPS web interface for the recipient only has a reply to the sender's email. If the sender(s) have a local domain of the home domain then they can create and forward new secure and unsecure messages. In this way the recipient cannot use the secure encrypted email server for their own email to anyone other than the sender unless they are on the home domain.

Figure 6A:
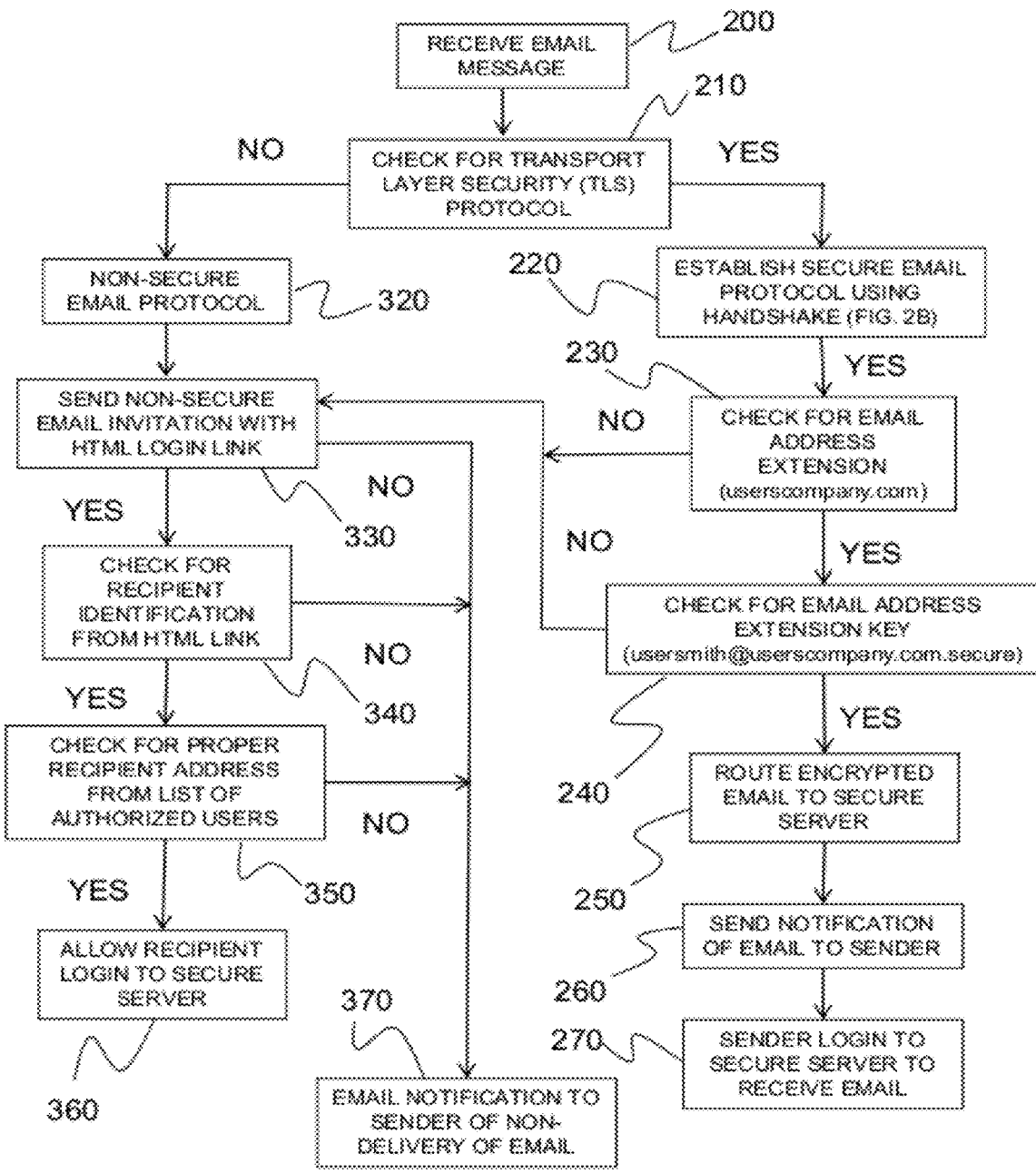
FIGS. 6A and 6B are flowcharts of the procedural steps of the present invention.
Figure 6B:
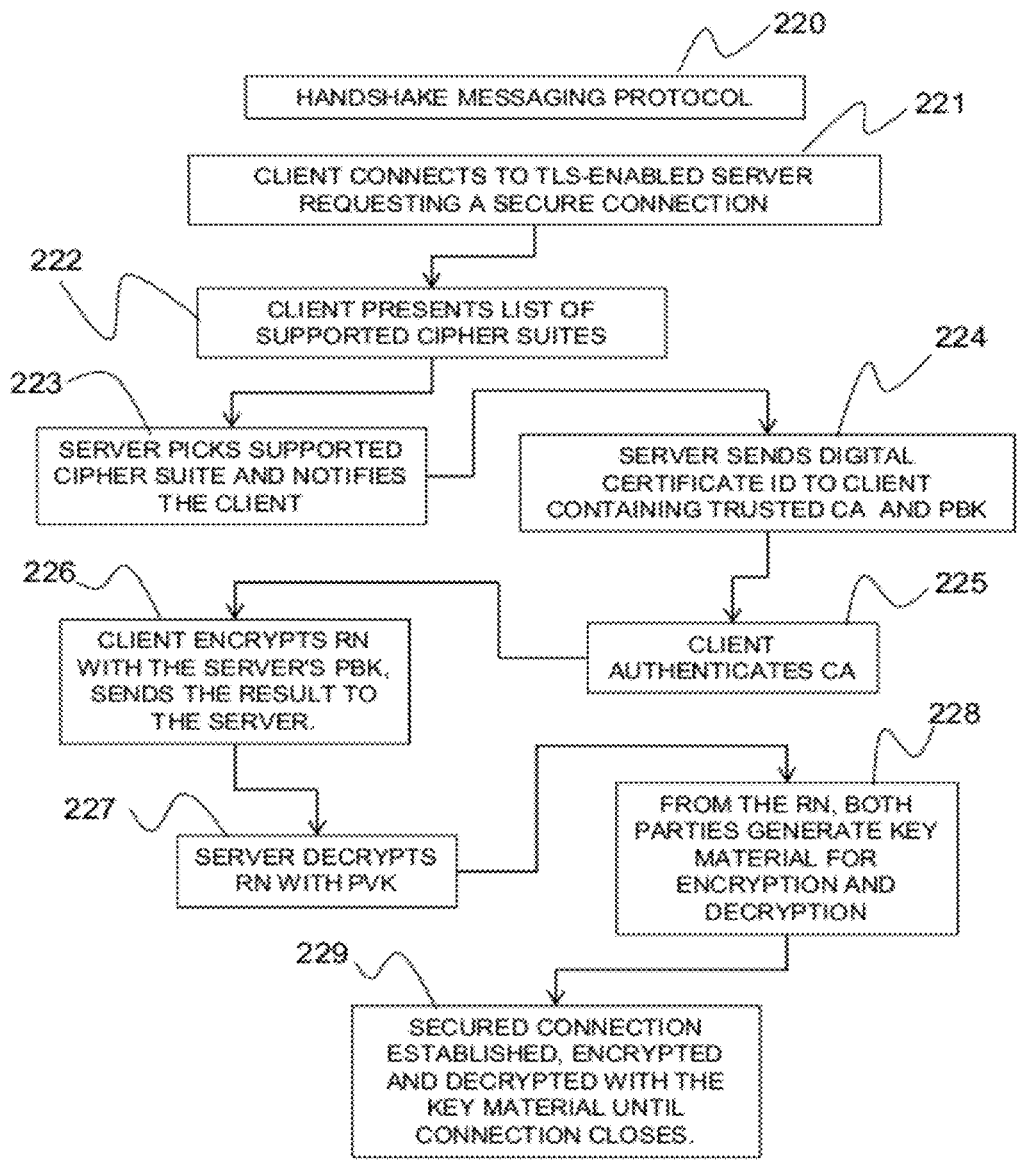

The secure email server may be configured in various embodiments to the user's LAN based on the security requirements of the user. For example, the secure server system 10 may be configured using TLS as the secure transmission protocol. In this embodiment a check for encryption is performed through a series of steps as shown in the flowchart of FIG. 6A. An incoming email message 200 is immediately checked to determine if the transmission protocol is TLS 210. This may be done by allowing the transmission to obtain a TLS connection immediately, by simply connecting to a separate port reserved for the purpose. For example, the secure email server may be configured by default to the TCP port for HTTPS 443, to distinguish it from HTTP on port 80. If the transmission protocol as TLS has been verified the secure email server performs a handshake 220 with the transmitting client to establish and verify the connection's security as shown in FIG. 6B. If any one of the steps of the handshake messaging protocol fails a connection is not created.

As shown in FIG. 6B secure connection under the TLS protocol is established when the secure server receives a request to connect from a secure client 221. The secure client presents a list of supported cipher suites to the secure server 222. A cipher suite is a named combination of authentication, encryption, and message authentication code (MAC) algorithms used to negotiate the security settings for a network connection using the TLS network protocol. From this list, the secure server picks the strongest cipher and hash function that it also supports and notifies the client of the decision 223. The server sends back its identification at step 124 in the form of a digital certificate that contains the server name, the server's trusted certificate authority (CA), and the server's public encryption key (PbK). The client may contact the server that issued the certificate and confirm that the certificate is authentic before proceeding at step 125. The client then encrypts a random number (RN) with the server's public key (PbK), and sends the result to the server 126. The server should be able to decrypt the number using its private key (PvK) 127. From the random number, both parties generate key material for encryption and decryption that establishes a secure connection until the connection closes 128. The administrative software 16 of the secure server system 10 provides for a trusted certificate authority to be set up on the secure server specific for secure identification of the users' local area network (LAN).

If the secure connection using TLS is verified at step 129, the email address extension is verified to confirm that the incoming email is properly addressed to the incoming mail server 130. For example, local email server domain name is commonly usercompany.com, the incoming email address extension must match this extension in order for the email to be accepted. The secure email server then checks the email address extension for the unique security identifier 140 as described above. This unique identifier may be in the address extension or the email subject line, and this identifier allows the email to be immediately routed to a secure recipient on the secure server local area network 150. If the secure recipient is not logged on to the server then the secure server generates an email message notifying the secure recipient 160 that a secure message available for viewing on the secure server. The secure recipient then logs in to the secure server to view the incoming email message 170.

If the secure connection using TLS is not established, or the address extension or unique identifier is not verified, the email is stored on the secure server and the steps of the non-secure email protocol 320 are performed. The server generates a non-secure email that includes an HTML logon link 330 for the non-secure recipient. The non-secure recipient then responds to the email notification and attempts to logon to the secure server. The HTML logon link includes a login name, password, coded verification and time stamp to identify the recipient at step 340. The coded verification and time stamp in HTML link prevents an email recipient from forwarding the email notification message to another email recipient and allowing them to log on to the secure server. A verification failure of the HTML link due to a mismatch of information will cause the server to generate an email notification to the sender stating that the email message cannot be delivered 370.

If the HTML link is verified, then the secure server may match the email recipient against a look up table of authorized users 350. If the non-secure recipient is not listed or listed as deny or limited access, the email notification of non-delivery is sent to the sender 370. If the non-secure recipient is properly identified as an authorized user, the secure server permits the logon of the non-secure recipient and the non-recipient is given access to the secure email message. Administrative tools can limit access for authorized users to view all or only a restricted number of emails that may be coded by subject line, date, sender, or recipient.

Since certain changes may be made in the above-described invention, without departing from the spirit and scope of the invention herein involved, it is intended that all of the subject matter of the above description or shown in the accompanying drawings shall be interpreted merely as examples illustrating the inventive concept herein and shall not be construed as limiting the invention.

I claim:

1. An electronic mail server system for handling encrypted email messages comprising;
   a first server including a microprocessor and a controller for receiving and disseminating email messages composed by a sender;
   a secure server including a microprocessor, a controller and a database for storage of email messages communicating with the first server;
   a first computer workstation where the sender composes email messages connected to and in communication with the first server;
   a second computer workstation where a recipient receives an email message from the secure server;
   wherein the secure server is connected directly to the internet for sending of the invitation to the recipient;
   wherein an encrypted email message is composed by the sender at the first computer workstation and the secure server stores the encrypted email message and sends an unencrypted invitation to the second computer workstation, the invitation including a link defining an access path for the recipient to view the encrypted email message stored on the secure server;
   wherein the link is an attachment to the email invitation which provides the access path to the recipient; and
   wherein the access path is secured by a password.

2. The electronic mail server system for handling encrypted email messages as set forth in claim 1 wherein the secure email message composed by the sender is sent encrypted from at least the first server to the secure server for storage.

3. The electronic mail server system for handling encrypted email messages as set forth in claim 1 wherein the secure server is located remote from the first computer workstation and connected to the first computer workstation via the internet.

4. The electronic mail server system for handling encrypted email messages as set forth in claim 1 wherein the secure server is connected to the first computer workstation via an intranet.

5. The electronic mail server system for handling encrypted email messages as set forth in claim 1 further comprising a domain extension key which is added by the sender to the recipient's domain by which the secure server recognizes an encrypted message to be stored at the secure server.

6. The electronic mail server system for handling encrypted email messages as set forth in claim 5 wherein the domain extension key further comprises a sender identifier portion that is compared by the secure server against a look-up table of authorized senders.

7. The electronic mail server system for handling encrypted email messages as set forth in claim 1 further comprising a subject field security key that is placed by the sender in the subject field of an email message by which the secure server recognizes an encrypted message to be stored at the secure server.

8. A method of sending and viewing encrypted email messages comprising the steps of:
   providing a first server including a microprocessor and a controller for receiving and disseminating email messages composed by a sender;
   providing a secure server including a microprocessor, a controller and a database for storage of email messages communicating with the first server;
   connecting a first computer workstation where the sender composes email messages with the first server;
   providing a second computer workstation where a recipient receives an email message from the secure server;
   connecting the secure server directly to the internet for sending of the invitation to the recipient;
   composing an encrypted email message by the sender at the first computer workstation and storing the encrypted email message at the secure server and sending an unencrypted invitation from the secure server to the second computer workstation including a link defining an access path for the recipient to view the encrypted email message stored on the secure server;
   providing the link as an attachment to the email invitation which provides the access path to the recipient; and
   securing the access path defined between the recipient and the stored email message by a password.

9. The method of sending and viewing encrypted email messages as set forth in claim 8 further comprising the step of sending the secure email message composed by the sender encrypted from at least the first server to the secure server for storage.

10. The method of sending and viewing encrypted email messages as set forth in claim 8 further comprising the step of locating the secure server remote from the first computer workstation and connected to the first computer workstation via the internet.

11. The method of sending and viewing encrypted email messages as set forth in claim 8 further comprising the step of connecting the secure server to the first computer workstation via the intranet.

12. The method of sending and viewing encrypted email messages as set forth in claim 8 further comprising the step of adding a domain extension key to the recipient's domain by which the secure server recognizes an encrypted message to be stored at the secure server.

13. The method of sending and viewing encrypted email messages as set forth in claim 8 further comprising the step of placing a subject field security key in the subject field of an email message by which the secure server recognizes an encrypted message to be stored at the secure server.

14. A method of sending and viewing encrypted email messages comprising the steps of:
   providing a first server including a microprocessor and a controller for receiving and disseminating email messages composed by a sender;
   providing a secure server including a microprocessor, a controller and a database for storage of email messages communicating with the first server;
   connecting a first computer workstation where the sender composes email messages with the first server;
   providing a second computer workstation where a recipient receives an email message from the secure server;
   connecting the secure server directly to the internet for sending of the invitation to the recipient;
   composing an encrypted email message by the sender at the first computer workstation which includes an encrypted message indentifying annotation in at least one of the recipient's domain and the encrypted email message subject line;
   storing the encrypted email message at the secure server and sending an unencrypted invitation from the secure server to the second computer workstation including a link defining an access path for the recipient to view the encrypted email message stored on the secure server;
   providing the link as an attachment to the email invitation which provides the access path to the recipient;

securing the access path defined between the recipient and the stored email message by a password; and providing the recipient with a password the use of which permits the recipient to complete the access path and view the encrypted email message stored on the secure server.

* * * * *